United States Patent [19]

Stein

[11] Patent Number: 4,734,622

[45] Date of Patent: Mar. 29, 1988

[54] DISSOCIATOR FOR ATOMIC MASERS

[75] Inventor: Samuel R. Stein, Boulder, Colo.

[73] Assignee: Ball Corporation, Muncie, Ind.

[21] Appl. No.: 863,210

[22] Filed: May 14, 1986

[51] Int. Cl.⁴ .................... H01J 7/24; H05B 31/26
[52] U.S. Cl. .................... 315/111.81; 315/111.01;
 315/111.21; 331/74.1; 250/251
[58] Field of Search .................. 315/111.01, 111.21,
 315/111.31, 111.41, 111.51; 331/94.1; 250/251

[56] References Cited

U.S. PATENT DOCUMENTS

| 3,255,423 | 6/1966 | Ramsey et al. | 331/94.1 |
| 3,296,552 | 1/1967 | Peters | 331/94 |
| 4,123,727 | 10/1978 | Peters | 331/94.1 |

OTHER PUBLICATIONS

"Hydrogen-Maser Principles and Techniques", D. Kleppner, H. C. Berg, S. B. Crampton, and N. F. Ramsey, *Physical Review*, vol. 138, No. 4A, (1965), pp. A975-976.

"The Development of a Magnetically Enhanced Hydrogen Gas Dissociator", L. Maleki, *Proceedings of the 36th Annual Symposium on Frequency Control*, (1982)—U.S. Army Electronics Research and Development Command, pp. 255-258.

Primary Examiner—Saxfield Chatmon
Attorney, Agent, or Firm—Gilbert E. Alberding

[57] ABSTRACT

The subject invention relates to a dissociator for an atomic hydrogen maser and comprises a dissociation chamber for generating hydrogen atomic capable of being deflected by a state-selecting magnetic field. The dissociation chamber is provided with an inlet opening for molecular hydrogen and an outlet for atomic hydrogen, radio frequency discharge means connected to said chamber and a yieldable member supporting said dissociation chamber and surrounding the same. The outlet acts as a beam-directing device with a wide range of orientations.

23 Claims, 2 Drawing Figures

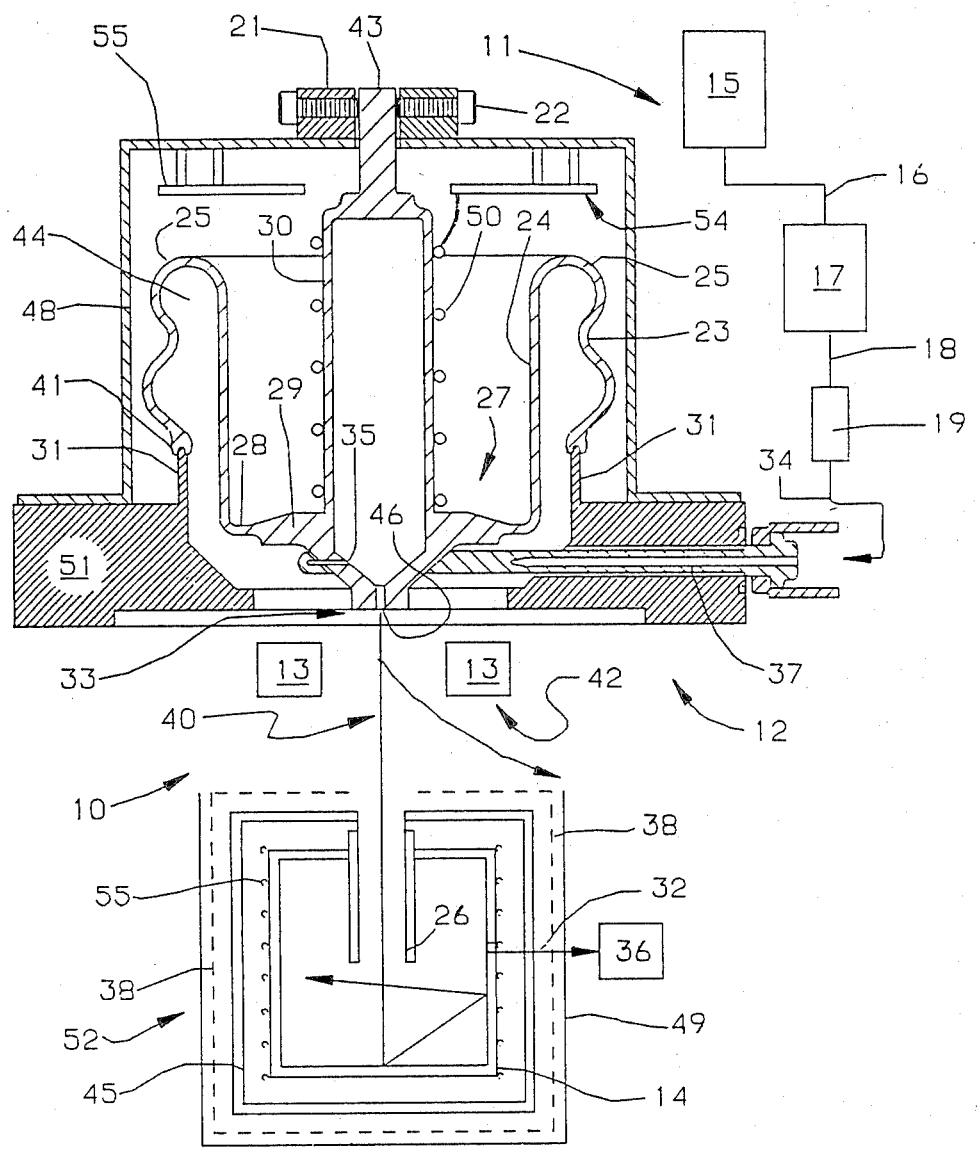
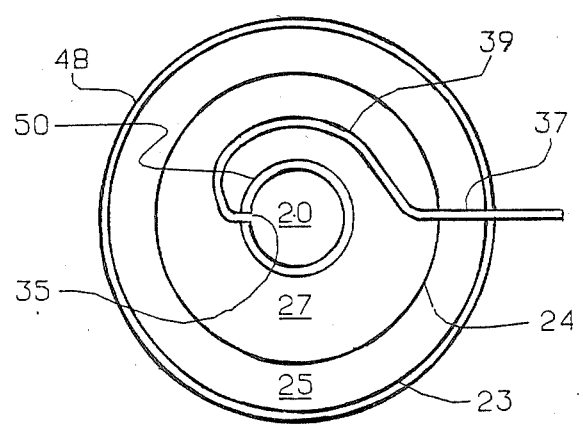
FIG. 1
FIG. 2

DISSOCIATOR FOR ATOMIC MASERS

BACKGROUND OF THE INVENTION

The present invention relates, in general, to beam directing devices and, more particularly, to an improved dissociating device for forming and steering atomic and molecular beams from a gaseous discharge or plasma into a target area, said dissociating device being useful in projecting a stream of atomic species into a maser, especially for a hydrogen maser frequency standard.

An atomic frequency standard is a device having a basic resonant system derived from an atomic or molecular specie experiencing a transition between two well-defined energy levels of the atom or molecule. The transition occurs in a reasonably convenient domain of the electromagnetic spectrum, the microwave region. The transition is employed as a highly stable frequency reference to which the frequency of a voltage-controlled crystal oscillator (VCXO) can be electronically locked. Thus, the high stability and relative insensitivity associated with an atomic reference frequency is thereby transferred to the VCXO.

Hydrogen, cesium and rubidium frequency standards are atomic-controlled oscillators in which the frequency of usually a 5 MHz or 10 MHz quartz crystal oscillator is controlled by means of a physics package and associated electronics that are devoted to maintaining that assigned output on a very long-term, exceedingly accurate and stable basis. By properly slaving the quartz crystal oscillator to the frequency of the atomic transition, the tendency of the quartz crystal to exhibit drifting due to aging and other inherent as well as environmental effects is markedly suppressed.

In a hydrogen maser frequency standard, hydrogen is customarily stored under pressure in a container and is passed through and purified by a hot palladium-silver alloy diffusion barrier that provides control of the hydrogen flux and subsequent beam intensity. The hydrogen, in molecular form, is introduced into an electrical discharge defined by a dissociation chamber which dissociates diatomic hydrogen into atomic hydrogen. Thereafter, the resultant hydrogen atoms emerge in a low-pressure region, are collimated into a beam and directed or focused through a state selection device, usually having a passageway of a few millimeters in diameter. The state selection device may be a hexapole or quadrapole magnet having a magnetic flux density at the pole tips of generally about 0.7 T or more. The state selection device generates an inhomogeneous magnetic field and is designed in such a manner so as to withdraw atoms in the lower hyperfine energy state and allows those hydrogen atoms to pass having the upper hyperfine state into a high Q-cavity resonator located in a microwave field region. In the resonator, the atoms of hydrogen undergo interaction with a microwave field at a resonant frequency of about 1.4 GHz.

The cavity resonator into which the selected atoms of hydrogen are directed is surrounded by magnetic shields and is provided with an inner solenoid that creates a weak, substantially uniform magnetic field which is applied to the microwave field region in order to separate the different sublevels of the hyperfine state to insure that transitions occur only between levels where the Zeeman effect is quadratic.

The cavity resonator is designed to allow extremely long interaction times of atoms with the microwave field by coating the walls of the resonator with special compositions, generally a fluorocarbon or the like to reduce atom perturbations through wall collisions. The interaction with the microwave field induces the hydrogen atoms in the selected energy state to make a transition to the lower state, thus radiating energy of a precise frequency to the field. In an active maser system, maser oscillations are self-sustaining when the atom density in the cavity resonator is such that the resultant induced transitions radiate enough coherent energy to more than offset cavity losses.

The hydrogen that departs from the cavity resonator may be readily removed by a vacuum system, generally by means of a high speed, getter pump along with a titanium sputter ion pump, both of which are generally housed in separate vacuum chambers. The getter materials that may be used for such a pump include $Zr$—$Al$, $Zr$—$C$ and $Zr$—$V$ alloys.

Although the general conditions recited above relate to an active maser mode, viz., using the maser principle itself in which there is coherent stimulated emission of the radiation within a suitable resonant structure, there is another mode, the so-called passive mode which may be employed for standard frequency generators. In the passive mode, an ensemble of particles (i.e. atoms or molecules) undergoing the desired quantum transition is used as a resonator and an auxiliary source of radiation (slave oscillator) is employed to produce the transitions which occur when the frequency of the radiation is near the nominal frequency. Thus, in a passive frequency standard, the atomic resonance has to be probed by an electromagnetic signal at the proper frequency which is produced by an auxiliary frequency generator whereas in an active frequency standard there is self-sustaining oscillation at the atomic resonance frequency.

In 1920 R. W. Wood was the first to employ a device to generate atomic hydrogen. Since then others have employed various means to produce atomic hydrogen including aerodynamic shock tubes, thermal dissociation means as well as radio frequency discharge devices. This latter technique, especially in the microwave range, has proven most convenient and, therefore, has been a preferred technique used in the art. In general, a r.f. discharge is employed in which external electrodes are placed proximate a glass dissociation chamber to produce a r.f. field capacitively or inductively coupled to a gaseous discharge or plasma generated within the chamber. The resultant hydrogen atoms emerge from the chamber into a low-pressure region through an orifice to define a stream of atomic hydrogen in the form of a beam.

The beam producing device is a critical component for quantum amplification, in general, and of stimulated emission of radiation for atomic and molecular species, in particular. As can be appreciated the efficiency of producing a stream of atoms, such as hydrogen, determines to a large measure the available flux of the beam and, accordingly, the stability as well as the reliability of the maser action itself.

It follows from the above considerations that proper alignment is essential in placing a stream of atomic species in a favorable directional mode. For an atomic maser, it is essential that a beam of the precise intensity be directed through a state selector and into the cavity resonator. Although a number of dissociation devices with fixed configurations have been employed, none have actually provided adequate focusing or alignment means offered directly from the discharge source, a shortcoming that has heretofore been neglected. Admittedly, the path is a straight one as the stream must pass through a state selector having a magnetic field as well as through a cavity tube leading into the cavity resonator of the maser. However, there is a need for fine adjustment through the magnetic field in order to optimize the effectiveness of the maser operation. Heretofore no practical steering or alignment device has been available for this critical aspect of precisely adjusting and directing atomic beams into cavity resonators and the like.

It is an object of this invention to provide a beam generating and steering device capable of projecting a stream of molecular or atomic particles along a predetermined path.

It is another object of the subject invention to provide a novel atomic beam directing means capable of adjusting and aligning a stream of species into a physics package for quantum amplification.

A further object of the subject invention to provide a dissociation chamber means capable of positioning a beam of particles generated within said chamber in an explicit and exacting fashion for obtaining selected atoms undergoing hyperfine transitions.

Another object of this subject invention is to provide a novel dissociator of the plasma type useful in conjunction with atomic or molecular beam frequency standards.

These, together with other objectives and advantages which will become subsequently apparent, reside in the details of construction and operation as more fully hereinafter described and claimed.

BRIEF SUMMARY OF THE INVENTION

In a maser operation such as a hydrogen maser a source of atomic hydrogen is produced by a gaseous discharge within a cylindrical bulb or chamber. In accordance with this invention a dissociator is provided with and is defined by a base, a dissociation chamber for generating atomic particles capable of being influenced by a state-selecting magnetic field, said chamber having an opening serving as an inlet for molecular hydrogen and an orifice serving as an exit for atomic hydrogen, the orifice causing the formation of a narrow stream of said atomic hydrogen therefrom, means adjacent said chamber for dissociating said molecular hydrogen to form said atomic hydrogen, yieldable member means connected to said chamber, and means for asserting displacement of the yieldable member means to orient the dissociation chamber. The yieldable member means comprises a flexible body that supports the dissociation chamber and generally surrounds said chamber. As part of the yieldable member a flexible tubing or conduit is employed therewith, said tubing interconnecting the source of molecular hydrogen with said dissociation chamber. The yieldable member surrounding the chamber comprises an outer wall connected to the base and an inner wall spaced from said outer wall and connected to the dissociation chamber, said inner and outer walls being connected by an intermediate section. The yieldable member interconnecting the hydrogen source to the chamber comprises a conduit or tubing member having a folded, bent or otherwise curved section that is designed to bend or flex during the movement of the dissociation chamber during its alignment in properly positioning the beam along a predetermined path.

The dissociator of the subject invention comprises a base, a dissociation chamber for generating atomic species, said chamber having an opening serving as an inlet and an orifice serving as an exit for projecting a beam of said atomic species therefrom, radio frequency discharge means coupled to said dissociation to sustain a radio frequency discharge with said chamber to effect dissociation of an introduced molecular species, a yieldable member supporting said dissociation chamber and connecting said base to said chamber, and means for moving said yieldable member to displace said member and said chamber to thereby axially align said beam along a predetermined path.

The radio frequency power for the radio frequency discharge means is affixed externally about the chamber by either probes or a coil, depending on whether a capacitive or an inductive coupling is employed. The means for moving the yieldable member may be by means of micrometer screws or any other means that would exert and maintain a constant force directly upon the chamber for proper directional alignment.

BRIEF DESCRIPTION OF THE DRAWINGS

The accompanying drawings, which are incorporated in and constitute a part of this patent specification, illustrate a preferred embodiment of the subject invention and, together with the description herein, serve to explain the principles of the invention.

FIG. 1 is a side-section view of the dissociation device of the subject invention (top portion of drawing) along with a representation of a hydrogen maser system schematically shown and incorporating the teachings of the present invention; and FIG. 2 is a bottom view of the dissociation device of the subject invention.

DESCRIPTION OF THE PREFERRED EMBODIMENTS

An active hydrogen maser 10 is shown schematically in FIG. 1, said maser comprising a hydrogen supply means 11, a dissociator device 12, a state selector 13 and a microwave cavity assembly 52 that includes a bulb or storage means. Hydrogen gas is furnished by a supply means 11 comprising a hydrogen storage container 15 that is connected by line 16 to a pressure transducer 17 and, thereafter, by line 18 to a palladium leak valve 19 that leads into the dissociator device 12 via line 34. The dissociator device 12 comprises a base or housing 51 having a sidewall 48 and collar 21 in which turnable micrometer screw members 22 are set therein. Supported within the housing 51 and secured to a sleeve 31 thereof is a dissociator assembly 20 comprising an outer upright wall 23 and an inner upright wall 24 connected together by an intermediate curved portion 25. The lower leg of wall 24 is integrally affixed to an annular member 27 which has an extended first and second connecting portions 28 and 29, respectively, that unite with a cylindrical chamber 30 in which dissociation is to take place, said chamber 30 being provided with an orifice 46 located at the apex of a dimple portion 47 at one end and a stem 43 at the other which extends into and through the collar 21. Generally, the orifice 46 may have a diameter between about 0.1 mm to about 0.3 mm. It is preferred that the dimple portion have a bore or tubular opening therethrough terminating at orifice 46 thereby providing a small nozzle-like structure. Cylindrical chamber 30 is provided with an inlet 35 for the introduction of hydrogen via a line 34 coming from the palladium leak valve 19. Line 34 passes into base 51 via a straight tube 37 (FIG. 2) and a curved tube 39 that communicates with the inlet 35 that opens into chamber 30. It is to be noted that tube 37 and curved tube 39 form a scythe-shaped configuration which offers some degree of resilience for a purpose to be described in more detail hereinafter.

As seen in the drawing the dissociator assembly 20 which is usually fabricated of glass is fusion bonded along a bonding surface 41 to the sleeve 31 that forms a concentric circle around the cylindrical chamber 30. The outer wall 23 is provided in cross section with a curved surface that leads to an intermediate curved portion 25 defining a U-shaped contour that interconnects the outer wall 23 with the inner wall 24, said outer and inner walls being spaced apart to provide an annular chamber 44. It can be seen in FIG. 1 that the inner wall 24 is connected at its lower leg to first and second connecting portions that unite said inner wall 24 to the cylindrical chamber 30.

The annular chamber 44 defines a vertical annular space circumferentially about and situated from the longitudinal axis of the cylindrical chamber 30 as well as a horizontally disposed annular spaced connecting therewith and extending between the base 51 and the annular member 27 and extending as well beneath the cylindrical chamber 30. Thus, the chamber 30 is, to some extent, free-floating as it is supported by the annular member 27.

The dissociator in accordance with this invention may be readily fabricated of glass and therefore would have a design that provides some degree of resilience. The dissociator may be readily formed from a silicate glass, especially borosilicate glass (viz., Pyrex Glass Brand No. 7740) by conventional glass forming techniques. The dissociator is to function within a vacuum system and generally is subjected to pressures within the chamber below about 1 mm Hg.

In a preferred embodiment the dissociator may be fabricated of different borosilicate glasses that are compatible with one another. In practice, the cylindrical chamber 30 is made of Pyrex Glass Brand No. 7740, the annular member 27 including the adjacent portion of the inner wall 24 is made of Pyrex Glass No. 3320 and the intermediate curved portion 25 and upright outerwall is fabricated of Pyrex Glass No. 7052. The last named glass is readily bondable to sleeve 31 and has the lowest softening temperature. Further, Pyrex Glass No. 3320 has an expansion coefficient of about midway between that of the other two glasses. In practice, it has been found advantageous to make an initial alignment prior to installation into a maser device by placing the dissociator unit formed of said three different glasses in an oven or annealing chamber at the softening temperature of the No. 7052 glass, then making any necessary alignment and, thereafter, cooling the dissociator to affix that alignment. In this fashion an initial coarse alignment in established and finer adjustment may be readily made by fine adjustment of micrometer screws means or the like.

Micrometer screws 22 may be turned or indexed to the proper setting to place a discrete force against the stem 43 to cause bending and displacement of the yieldable means including the intermediate curved portion 25 that acts as a flexible linkage between the cylindrical chamber 30 and the housing 51. It will be appreciated that the chamber 30 may be displaced or deflected over a plurality of points about collar 21 to cause corresponding changes in the orientation of the orifice 46. Since the U-shaped structure comprising walls 23 and 24 along with curved portion 25 is fabricated of vitreous material and designed in the aforedescribed yieldable configuration a substantial degree of flexural movement is achievable to provide full radial displacement of the orifice about the longitudinal axis by merely adjusting the corresponding micrometer screw or screws to effect the same. In effect, orifice 46 acts as a beam-directing nozzle with a discrete range orientations.

As the hydrogen gas is drawn from the dissociation chamber 30 by means of a vacuum system (not shown), more hydrogen is continuously supplied to the chamber 30 by means of the palladium leak valve 19 which purifies the hydrogen and at the same time maintains a steady state pressure in the dissociation chamber, generally about 0.1. Torr hydrogen pressure. To form the plasma or gaseous discharge, r.f. power (not shown) is connected to means associated with chamber 30, said means being coupled externally around the cylindrical surface of chamber 30 with either two probes or a coil, depending on whether an inductive coupling or capacitive coupling scheme is employed.

It will be appreciated that all of the components of the dissociator are all rigid and made of glass or metal. This is a most favorable construction as a practical matter for a high-vacuum system in that no extraneous vapors or gases are introduced from decomposition of chemically unsable media as would be the case if portions or components were made of materials comprising elastomers, plastics and the like.

In FIG. 1 the r.f. power is coupled by an inductive coil 50 which is supplied by an adequate power source, not shown. The dissociator is provided with a oscillator circuit 54 operating at a frequency of between about 50 to 150 MHz, the circuit being mounted on a stand off board 55. In viewing the discharge region in actual operation of the hydrogen maser, a reddish purple coloration characteristic of atomic hydrogen is observed that is caused by the molecular hydrogen being constantly dissociated by collisions with hot electrons in the gaseous plasma. The atomic hydrogen produced in the discharge region issues from the orifice 46 in the form of a stream or beam 40 that pass through a state selecting magnet 13 disposed adjacent the dissociation chamber 20 which focuses out hydrogen atoms 42 that are not in the desired hyperfine energy state. In effect, the magnetic field established by the state selector throws out along path 42 atoms in the lower hyperfine state and focuses atoms along 40 in the upper hyperfine state.

As previously discussed, it can now be appreciated that the beam 40 may be readily aligned most advantageously by movement of screw means 22 which orients the chamber 20. The beam 40 of selected atoms is directed through a cavity tube 26 which acts as a passageway to permit only axially directed atom 40 in the beam from the orifice 46 to enter into a microwave cavity 49. Generally, the microwave cavity 14 operates in the $TE_{011}$ mode. The cavity 14 is surrounded by concentric moly-permalloy magnetic shielding 38. A static magnetic field is produced by an a.c. coil 55 outside the microwave cavity to separate the Zeeman levels of the upper hyperfine state.

For a good filling capacity, the resonator cavity 14 may take a number of shapes but generally it is in the form of a bulb or a right circular cylinder with either a separate or integrated bulb for containment of the hydrogen atoms.

As is known, when the microwave cavity 49 is tuned close to the transition frequency and when the intensity of the incoming beam of atoms is large enough, oscillation takes place in which the incoming atoms in the upper level are stimulated to radiate a signal having an exceedingly stable frequency. In effect, the atoms that enter the cavity resonator 14 enter an interaction region in an upper hyperfine state and are stimulated to make transitions to the lower hyperfine state. The generated signal is picked up by the microwave output loop 32 and is used to lock a crystal oscillator to the stable hydrogen transition frequency via frequency synthesizer and comparator 36.

It is to be understood that a number of modifications to the abovedescribed invention may be made by those skilled in the art, and it is intended to cover all such modifications which fall within the spirit and scope of the appended claims.

What is claimed is:

1. A dissociator comprising a base, a dissociation chamber for generating atomic particles capable of being influenced by a state-selecting magnetic field, said chamber having an opening serving as an inlet and an orifice serving as an exit for causing the formation of a narrow beam of atomic particles therefrom, means for dissociating molecular species to form atomic particles, yieldable means comprising a flexible concentric wall and feed tube connected to said chamber, and means for asserting displacement of the yieldable means to orient the dissociation chamber.

2. A dissociator of claim 1 wherein the flexible concentric wall and feed tube are glass, and the dissociation chamber comprises a cylindrical glass vessel having a stem portion secured to one end and the feed tube forms a scythe-shape about the cylindrical glass vessel and the exit at the other end.

3. A dissociator of claim 2 wherein the means for asserting displacement of the yieldable means engages the stem and displaces the flexible concentric wall end feed tube.

4. A dissociator of claim 3 wherein the means for dissociating comprises a power source capacitively or inductively coupled to the dissociation chamber.

5. In a dissociator, wherein said dissociator comprises a base, a dissociation chamber for generating atomic species capable of being deflected by a magnetic field, said dissociation chamber having an opening serving as an inlet and an orifice serving as an exit for projecting a beam of said atomic species therefrom, radio frequency discharge means coupled to said dissociation chamber to sustain a radio frequency discharge within said chamber to effect substantial dissociation of the introduced molecular species, the improvement comprising a yieldable concentric wall member supporting said dissociation chamber and connecting said base to said chamber, and means for moving said yieldable concentric wall member to displace said member and said chamber to thereby axially align said beam along a predetermined path traversing said magnetic field.

6. A dissociator of claim 5 wherein the yieldable concentric wall member comprises inner and outer walls spaced apart and connected by an intermediate section, and an annular portion interconnecting said inner wall to said dissociation chamber.

7. A dissociator of claim 5 wherein the dissociation chamber is a cylindrical vessel having a stem portion secured to the upper part of said dissociation chamber.

8. A dissociator of claim 5 wherein the inlet for the introduction of molecular species comprises a tubing extending through the base of said dissociator and in communication with said dissociation chamber.

9. A dissociator of claim 5 wherein the tubing partially circumscribes the dissociation chamber to define a yieldable section surrounding the same.

10. A dissociator of claim 5 wherein the radio frequency discharge means is applied by external electrodes to effect a gaseous discharge in a form of a plasma within said chamber.

11. A dissociator of claim 10 wherein the gaseous discharge is driven by said radio frequency discharge means capacitively or inductively coupled to said plasma.

12. A dissociator of claim 11 wherein the plasma comprises atomic hydrogen.

13. In a dissociator, wherein said dissociator comprises a dissociation chamber for generating a stream of atomic species, said chamber having an opening serving as an inlet and an orifice serving as an exit for projecting a stream of atoms therefrom, the improvement comprising a yieldable member supporting said dissociation chamber and a yieldable tube connecting said chamber to a source of atomic material.

14. A dissociator of claim 13 including radio frequency discharge means coupled to said dissociation chamber to sustain a radio frequency discharge within said chamber to effect dissociation of molecular species introduced into the inlet.

15. A dissociator of claim 14 wherein the radio frequency means comprises a resonant circuit operating at a frequency of between about 50 to about 150 MHz.

16. A dissociator of claim 13 wherein the chamber and the yieldable member are fabricated from different glasses to permit chamber rigidity as well as yieldable member flexibility.

17. A dissociator of claim 13 wherein the orifice of said chamber is about 0.2 mm.

18. In a dissociator, wherein said dissociator comprises a base, a dissociation chamber for generating atomic species capable of being deflected by a state-selecting magnetic field, said dissociation chamber having an opening serving as an inlet for the introduction of molecular species and an orifice serving as an exit for projecting a stream of said atomic species therefrom, radio frequency discharge means connected to said chamber, said discharge means being applied by external coils or electrodes to effect a gaseous discharge in a form of a plasma within said chamber, the improvement comprising a yieldable member comprising a concentric wall supporting said dissociation chamber and surrounding said chamber, and means for moving said member to displace the yieldable concentric wall and dissociation chamber to thereby axially align said stream of atoms along a predetermined path traversing said state-selecting magnetic field.

19. A dissociator of claim 18 wherein the moving means includes micrometer screw means for exerting and maintaining a constant force directly upon said dissociation chamber to thereby effect displacement of said yieldable member and axially align said beam along a predetermined path traversing said magnetic field.

20. The dissociator of claim 18 wherein the yieldable member supporting the dissociation chamber comprises an inner wall portion, an outer wall portion and an intermediate curved portion;

said inner and outer wall portions and intermediate portion flexing in response to said means for moving said yieldable member and allowing radial displacement of said dissociation chamber.

21. The dissociator of claim 20 wherein said dissociation chamber is fabricated of Pyrex Glass No. 7740.

22. The dissociator of claim 20 wherein said intermediate curved portion and said outer wall are fabricated of Pyrex Glass No. 7052.

23. The dissociator of claim 20 wherein said intermediate curved portion and said inner wall are fabricated of Pyrex Glass No. 3320.

* * * * *